US005732875A

United States Patent [19]

Ziemek et al.

[11] Patent Number: 5,732,875

[45] Date of Patent: Mar. 31, 1998

[54] METHOD FOR PRODUCING A SECTOR CONDUCTOR FOR ELECTRIC POWER CABLES

[75] Inventors: Gerhard Ziemek; Michael Meyer, both of Langenhagen, Germany

[73] Assignee: Alcatel Kabel AG & Co., Germany

[21] Appl. No.: 668,096

[22] Filed: Jun. 18, 1996

[30] Foreign Application Priority Data

Jun. 22, 1995 [DE] Germany ........................ 195 22 628.3

[51] Int. Cl.$^6$ ............................ B23K 31/02; B21D 39/00

[52] U.S. Cl. ....................... 228/148; 228/156; 174/129 R

[58] Field of Search ..................................... 228/130, 148, 228/156, 147; 174/128.2, 129 R, 129 S

[56] References Cited

U.S. PATENT DOCUMENTS

| | | | |
|---|---|---|---|
| 1,231,568 | 7/1917 | Clark | 174/129 S |
| 2,083,889 | 6/1937 | Wyatt | 174/129 R |
| 3,894,675 | 7/1975 | Klebl et al. | 228/156 |

FOREIGN PATENT DOCUMENTS

| | | | |
|---|---|---|---|
| 909714 | 4/1954 | Germany | 174/129 R |
| 2942925 | 5/1981 | Germany . | |

OTHER PUBLICATIONS

Book entitled "Introduction to Electric Power Cable Technology part 2, type process I, from the Cable and Metal Works Gutehoffnüngshutte (Good Hope Smeltery) AG, Apr. 1969.

*Primary Examiner*—P. Austin Bradley
*Assistant Examiner*—Jeffrey T. Knapp
*Attorney, Agent, or Firm*—Ware, Fressola, Van der Sluys & Adolphson LLP

[57] ABSTRACT

A method for producing a sector conductor for electric power cables is introduced, whereby a number of metal wires are joined closely together into a core (8) with a sector-shaped cross section. A lengthwise running metal strip is formed around the core (8) and its longitudinally abutting edges are welded into a tube (9), whose dimensions are reduced so that it lies closely against the core (8) and surrounds it.

5 Claims, 1 Drawing Sheet

METHOD FOR PRODUCING A SECTOR CONDUCTOR FOR ELECTRIC POWER CABLES

BACKGROUND OF THE INVENTION

1. Technical Field

The invention refers to a method for producing a sector conductor for electric power cables, whereby a number of metal wires are joined closely together into a core with a sector-shaped cross section (DE book "Introduction to Electric Power Cable Technology" part 2, type process I, from the Cable and Metal Works Gutehoffnungshütte (Good Hope Smeltery) AG, April 1969).

2. Description of the Prior Art

In the sense of the invention, "power Cables" are low, medium and high-voltage cables with plastic-insulated conductors. The conductors can be made of copper or aluminum. Sector conductors have the advantage over round conductors in that a cable built up of several conductors has a smaller outside diameter. The electrical strain on the insulating sheaths surrounding the conductors is greatest on the surface of the conductor. To reduce this strain, an inner semi-conducting layer is placed over the conductor in the known manner. It can comprise a conducting tape or a conducting mixture. Multi-wire conductors have an irregular surface around and along their entire length, so that a sufficiently strong adhesion of the inner semi-conducting layer to the conductor is difficult to achieve with circular conductors. Even greater problems occur with multi-wire sector conductors, since their corners or edges are extremely irregular.

This also applies to the cables with sector conductors described in the above-mentioned DE book, which are only surrounded by the usual layer of insulation. Until now, the multi-wire sector conductors were only used for low voltage cables, in which the inner semi-conducting layer could be omitted. Other types of conductors are used for higher voltage power cables.

SUMMARY OF THE INVENTION

It is an object of the invention to improve the method described earlier, so that multi-wire sector conductors can also be used for higher voltage power cables.

This object is fulfilled by the invention in that a lengthwise running metal strip is formed around the core, and its longitudinally abutting edges are welded into a tube, whose dimensions are reduced so that it lies closely against the core and surrounds it.

The sector conductor produced by this method can be joined with other similarly constructed conductors into a nearly gapless cable core with a circular cross section. A corresponding cable with the same conductor cross section has a smaller diameter as compared to a cable with round conductors. Less material is therefore needed for all the layers surrounding the cable core. In addition, such a "thin" cable is easier to pull through existing cable conduits, which are often overfilled, especially in branching centers. The tube that is installed over the multi-wire core encloses same and forms a tight seal. This method allows it to be placed around the core in a simple manner, so that the entire sector conductor has a smooth surface. This also applies to the critical corners or edges of the multi-wire sector conductor. In addition, the tube seals the multi-wire core in such a way that moisture, which has entered the core, cannot escape to the outside.

The inner semi-conducting layer therefore adheres well to this sector conductor and protects it against moisture. The sector conductor can therefore be used for higher voltage power cables, with a corresponding insulation sheath.

A conductor with a multi-wire core surrounded by a tube is known from DE-A-2 942 925. However, this known conductor is configured as a round conductor, where the manufacture of the tube with a smooth outer surface is not a problem. When the present method was used, it was surprisingly found that the basic construction of the known conductor can also be used for sector conductors. With the targeted deformation of the tube closed by welding, it is possible to produce a sector conductor that is also smooth at the critical corners or edges. When this method is used, the pronounced irregularities, particularly at the corners or edges of a multi-wire core, cannot be noticed on the outside of the conductor. The sector-shaped conductor rather has an all around smooth surface. The inner semi-conducting layer can therefore be omitted for certain applications.

The invention will be fully understood when reference is made to the following detailed description taken in conjunction with the accompanying drawing.

BRIEF DESCRIPTION OF THE DRAWING

The method according to the invention will be explained as a configuration example by means of the drawing, where.

DETAILED DESCRIPTION OF THE INVENTION

Figure 1:
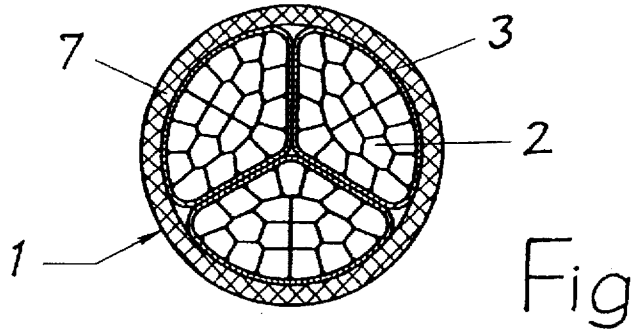
FIG. 1 is a cross section of a power cable, whose conductors are manufactured in accordance with the method of the invention.
Figure 2:
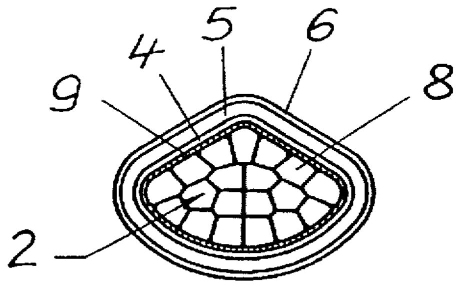
FIG. 2 is an enlarged view of a sector conductor surrounded by an insulation sheath.

The cable 1 in FIG. 1 has three sector conductors 2, which are each surrounded by an insulation sheath 3. As shown in FIG. 2, the insulation sheath 3 comprises an inner semi-conducting layer 4, an insulation 5 and an outer conducting layer 6. Each sector conductor 2 extends over 120° and substantially forms a sector of a circle. They add up to a circular cable core, over which a jacket 7 is placed, which is made of insulation material. When a different number of conductors is used, they extend over a different angle. The angle is 90° with four sector conductors 2. The cross sections of the sector conductors 2 are chosen so that they always add up to a circle.

Each sector conductor 2 contains a multi-wire core 8 made of twisted wires, and a tube 9 with a smooth outer surface, which tightly surrounds the core 8. The core 8 and tube 9 can be made of copper or aluminum, or of a combination of both materials.

Figure 3:
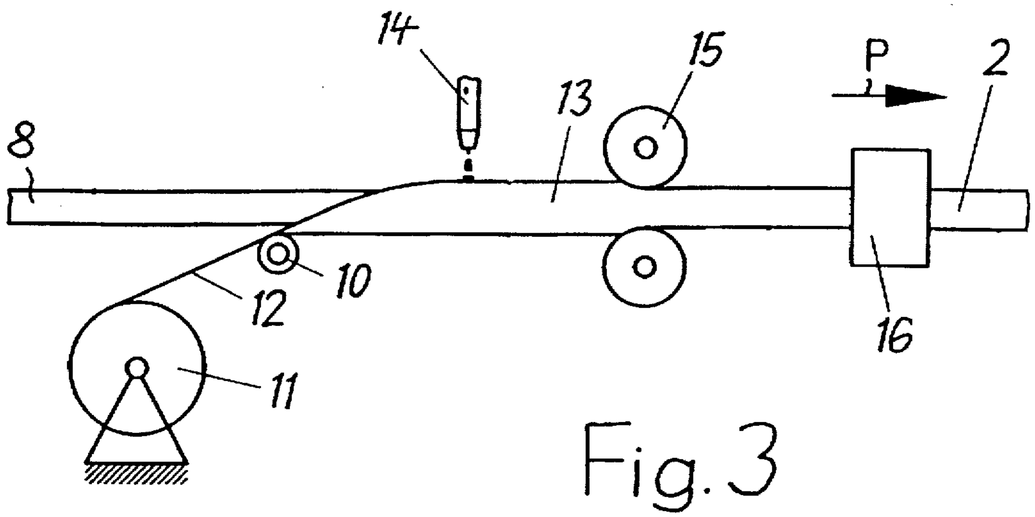
FIGS. 3 and 4 schematically illustrate two different arrangements for carrying out the method.

For example, a sector conductor 2 is produced as follows:

A sector-shaped preformed core 8 of a sector conductor 2, which contains many copper wires, is drawn through the installation schematically illustrated in FIG. 3, in the direction of arrow P. It reaches a forming device 10 symbolized by a wheel, wherein a copper strip 12, which is drawn from a spool 11, is formed into a tube 13 around the core 8. The longitudinally abutting edges of the tube 13, which abut against each other, are welded by a device 14. The tube 13 surrounds the sector-shaped core 8 with a gap between them.

The circular tube 13 is formed into a sector-shape by a roller machine 15. At the same time, its dimensions are reduced so that is lies closer around the core. In the subsequent drawing machine 16, the now sector-shaped tube 13 is drawn into a tightly sealed device around the core 8. The finished sector conductor 2 then has an all around smooth surface.

Figure 4:
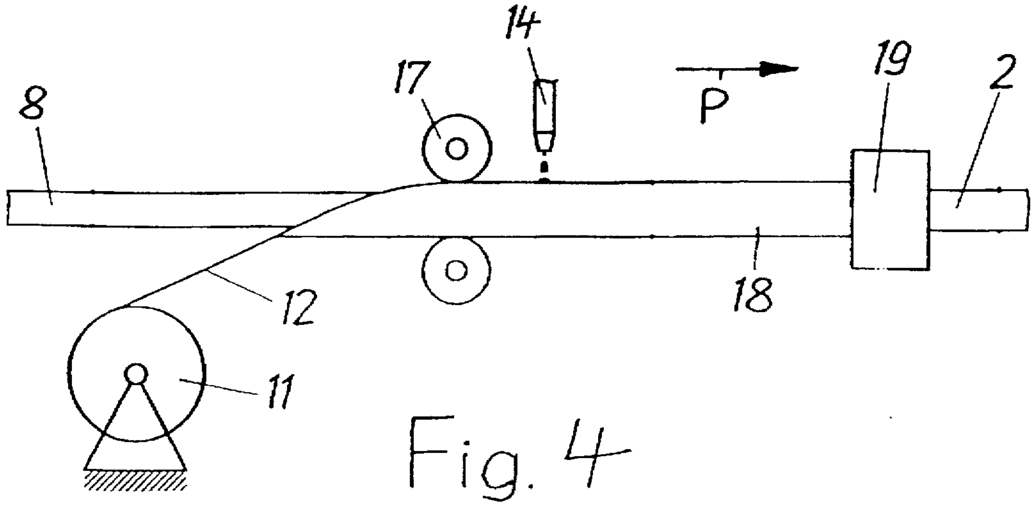

In another configuration of the method illustrated in FIG. 4, the copper strip 12, which is drawn from a spool 11, is routed to a forming device 17, where it is formed into a tube 18 with a sector-shaped cross section, which is adapted to the sector-shaped core 8. After being welded in installation 14, it surrounds the core 8 with little gap. Again, the already sector-shaped tube 18 is then drawn by a drawing machine 19 into a tightly sealed device around the core 8. The finished sector conductor 2 then has an all around smooth surface when it exits from the drawing machine 19.

A sector conductor 2 is produced in accordance with both described methods, whose surface is sufficiently smooth so that the inner semi-conducting layer 4 can be omitted for certain applications. The insulation sheath 3 of the sector conductor 2 then only comprises the insulation 5 and the outer conducting layer 6.

The preferred embodiments described above admirably achieve the objects of the invention. However, it will be appreciated that departures can be made by those skilled in the art without departing from the spirit and scope of the invention which is limited only by the following claims.

What is claimed is:

1. A method for producing a sector conductor for electric power cables, the method comprising the steps of:

(a) providing a number of metal wires joined closely together into a core with a sector-shaped cross section;

(b) forming a lengthwise running metal strip into a slotted tube around the core, the slotted tube having longitudinally abutting edges;

(c) welding the longitudinally abutting edges to form a welded tube; and (d) reducing the welded tube so that it lies closely against the core and surrounds it so as to form a sector conductor which sustantially forms a sector of a circle.

2. A method as claimed in claim 1, wherein, in the reducing step, the welded tube formed around the core is reduced in size and sector-shaped through rolling and then formed to lie against the core by drawing.

3. A method as claimed in claim 1, wherein, in the reducing step, the welded tube formed around the core is reduced to lie against the core by drawing.

4. A method as claimed in claim 1, wherein, during the forming step, the metal strip, which serves to produce the slotted tube, is formed into a sector-shape.

5. A method as claimed in claim 4, wherein, in the reducing step, the welded tube formed around the core is reduced to lie against the core by drawing.

* * * * *